(12) United States Patent
Dettinger et al.

(10) Patent No.: US 9,026,901 B2
(45) Date of Patent: May 5, 2015

(54) VIEWING ANNOTATIONS ACROSS MULTIPLE APPLICATIONS

(75) Inventors: Richard D. Dettinger, Rochester, MN (US); Cale T. Rath, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 2790 days.

(21) Appl. No.: 10/845,387

(22) Filed: May 13, 2004

(65) Prior Publication Data

US 2005/0256825 A1 Nov. 17, 2005

(51) Int. Cl.
*G06F 17/00* (2006.01)
*G06F 17/30* (2006.01)

(52) U.S. Cl.
CPC ................. *G06F 17/3056* (2013.01)

(58) Field of Classification Search
CPC ..................................... G06F 17/241
USPC ................ 715/512, 230, 200, 234–237
See application file for complete search history.

(56) References Cited

U.S. PATENT DOCUMENTS

| | | | |
|---|---|---|---|
| 5,253,362 A | 10/1993 | Nolan et al. | |
| 5,309,359 A | 5/1994 | Katz et al. | |
| 5,404,295 A | 4/1995 | Katz et al. | |
| 5,548,739 A | 8/1996 | Yung | |
| 5,600,775 A | 2/1997 | King et al. | |
| 5,761,429 A | 6/1998 | Thompson | |
| 5,832,474 A | 11/1998 | Lopresti et al. | |
| 5,930,746 A | 7/1999 | Ting | |
| 5,940,821 A | 8/1999 | Wical | |
| 5,953,718 A | 9/1999 | Wical | |
| 5,999,182 A | 12/1999 | Etchemendy et al. | |
| 6,038,560 A | 3/2000 | Wical | |
| 6,195,652 B1 | 2/2001 | Fish | |
| 6,226,638 B1 | 5/2001 | Okura et al. | |
| 6,226,792 B1 | 5/2001 | Goiffon et al. | |
| 6,249,784 B1 | 6/2001 | Macke et al. | |
| 6,260,043 B1 * | 7/2001 | Puri et al. | 707/101 |
| 6,279,014 B1 | 8/2001 | Schilit et al. | |
| 6,311,189 B1 | 10/2001 | deVries et al. | |
| 6,332,144 B1 | 12/2001 | deVries et al. | |
| 6,336,124 B1 * | 1/2002 | Alam et al. | 715/523 |

(Continued)

FOREIGN PATENT DOCUMENTS

| | | |
|---|---|---|
| EP | 1039398 A3 | 5/2002 |
| WO | 9715018 A1 | 4/1997 |

(Continued)

OTHER PUBLICATIONS

Chatterjee et al., IBM Patent Application Serial No. 10/600,014, filed Jun. 20, 2003, "Universal Annotation Management System".

(Continued)

*Primary Examiner* — Manglesh M Patel

(57) ABSTRACT

Methods, systems, and articles of manufacture for viewing annotations created for data objects appearing in a data source using a second application configured to access and view the data source. Some embodiments present users viewing a data source with an indication of data objects in the data source that have been by other applications accessing the data source. An annotation system may use a mapping component to transform a set of parameters suitable for the first application to identify an annotated data object into a set of parameters suitable for the second application to view an annotated data object in a common data source.

16 Claims, 6 Drawing Sheets

(56) References Cited

U.S. PATENT DOCUMENTS

| | | |
|---|---|---|
| 6,453,312 B1 | 9/2002 | Goiffon et al. |
| 6,460,034 B1 | 10/2002 | Wical |
| 6,484,156 B1 | 11/2002 | Gupta et al. |
| 6,493,721 B1 | 12/2002 | Getchius et al. |
| 6,496,843 B1 | 12/2002 | Getchius et al. |
| 6,519,592 B1 | 2/2003 | Getchius et al. |
| 6,519,603 B1 | 2/2003 | Bays et al. |
| 6,523,028 B1 | 2/2003 | DiDomizio et al. |
| 6,549,922 B1 | 4/2003 | Srivastava et al. |
| 6,571,295 B1 | 5/2003 | Sidana |
| 6,665,581 B2 | 12/2003 | Nishida et al. |
| 6,665,681 B1 | 12/2003 | Vogel |
| 6,687,878 B1 | 2/2004 | Eintracht et al. |
| 6,725,227 B1 | 4/2004 | Li |
| 6,799,298 B2 | 9/2004 | deVries et al. |
| 6,826,559 B1 | 11/2004 | Ponte |
| 6,847,384 B1* | 1/2005 | Sabadell et al. ............ 345/672 |
| 6,871,318 B1 | 3/2005 | Wynblatt et al. |
| 6,889,260 B1* | 5/2005 | Hughes .................. 709/246 |
| 6,901,428 B1 | 5/2005 | Frazier et al. |
| 6,934,909 B2* | 8/2005 | Tewari ................... 715/523 |
| 6,956,593 B1 | 10/2005 | Gupta et al. |
| 6,996,558 B2 | 2/2006 | Dettinger et al. |
| 6,996,728 B2 | 2/2006 | Singh |
| 6,999,959 B1 | 2/2006 | Lawrence et al. |
| 7,010,779 B2* | 3/2006 | Rubin et al. ............. 717/106 |
| 7,013,307 B2 | 3/2006 | Bays et al. |
| 7,107,260 B2 | 9/2006 | Nakamura et al. |
| 7,152,072 B2 | 12/2006 | Dobrowski et al. |
| 7,162,691 B1 | 1/2007 | Chatterjee et al. |
| 7,194,483 B1 | 3/2007 | Mohan et al. |
| 7,243,301 B2 | 7/2007 | Bargeron et al. |
| 7,260,777 B2 | 8/2007 | Fitzsimons et al. |
| 7,315,857 B2 | 1/2008 | Dettinger et al. |
| 7,707,212 B2 | 4/2010 | Dettinger et al. |
| 2001/0051958 A1 | 12/2001 | deVries et al. |
| 2002/0026461 A1* | 2/2002 | Kutay et al. ................. 707/523 |
| 2002/0143860 A1 | 10/2002 | Catan |
| 2002/0174201 A1 | 11/2002 | Ramer et al. |
| 2003/0061028 A1 | 3/2003 | Dey et al. |
| 2003/0069881 A1 | 4/2003 | Huttunen |
| 2003/0074375 A1 | 4/2003 | Nakamura et al. |
| 2003/0196164 A1 | 10/2003 | Gupta et al. |
| 2004/0068489 A1 | 4/2004 | Dettinger et al. |
| 2004/0138946 A1 | 7/2004 | Stolze |
| 2004/0150669 A1 | 8/2004 | Sabiers et al. |
| 2004/0163042 A1 | 8/2004 | Altman |
| 2004/0192343 A1 | 9/2004 | Toyama |
| 2004/0205514 A1 | 10/2004 | Sommerer et al. |
| 2004/0205545 A1* | 10/2004 | Bargeron et al. ............ 715/512 |
| 2004/0260714 A1 | 12/2004 | Chatterjee et al. |
| 2004/0261016 A1 | 12/2004 | Glass et al. |
| 2005/0091197 A1 | 4/2005 | Dettinger et al. |
| 2005/0091198 A1 | 4/2005 | Dettinger et al. |
| 2005/0160356 A1* | 7/2005 | Albornoz et al. ............ 715/512 |
| 2005/0203876 A1 | 9/2005 | Cragun et al. |
| 2005/0256825 A1 | 11/2005 | Dettinger et al. |
| 2005/0256867 A1 | 11/2005 | Walther et al. |
| 2008/0034283 A1* | 2/2008 | Cragun et al. ................. 715/232 |
| 2008/0256062 A1 | 10/2008 | Dettinger et al. |

FOREIGN PATENT DOCUMENTS

| | | |
|---|---|---|
| WO | 9939286 A1 | 8/1999 |
| WO | 0051021 A3 | 12/2001 |
| WO | 0124060 A3 | 4/2003 |

OTHER PUBLICATIONS

Cragun et al., IBM Patent Application Serial No. 10/600,382, filed Jun. 20, 2003, "Heterogeneous Multi-Level Extendable Indexing for General Purpose Annotation Systems".

Naser Barghouti, Stephen North, "Improvise—a process modeling interface with multimedia graph diagrams", ACM Multimedia '95, http://www.cs.uic.edu/~ifc/mmwsproc/north/north.html.

Electrical Schematics Page, Apr. 25, 2002, http://www.jlab.org/accel/inj_group/elec1.htm.

"GSDB 1.0 Schema Manual," Dec. 1996, <http://www.negr.org/research/sequence/schema.html.>.

PCT International Search Report dated May 10, 2004, International Application No. PCT/EP2004/051082, International Filing Date Oct. 6, 2004.

Christopher G. Chute, "Information Retrieval Using Vertical and Horizontal Query Expansion", Mayo U.S. Appl. No. 10/638,270, filed Aug. 7, 2003.

* cited by examiner

VIEWING ANNOTATIONS ACROSS MULTIPLE APPLICATIONS

CROSS-REFERENCE TO RELATED APPLICATIONS

The present invention is related to the commonly owned, co-pending U.S. patent applications, U.S. Ser. No. 10/600,014, filed Jun. 20, 2003 entitled "Universal Annotation Management System," U.S. Ser. No. 10/600,382, filed Jun. 20, 2003 entitled "Heterogeneous Multi-Level Extendable Indexing for General Purpose Annotation Systems," and U.S. patent application, U.S. Ser. No. 10/845,501, filed May 13, 2004 entitled "Method and System for Propagating Annotations Using Pattern Matching,", incorporated herein by reference.

BACKGROUND OF THE INVENTION

1. Field of the Invention

The present invention relates to the field of data entry and retrieval and, more particularly, to a method and system for viewing annotations, created for data objects in a data source using a first application, in a second application capable of accessing the data source.

2. Description of the Related Art

There are well known methods for capturing and storing explicit knowledge as data, for example, in relational databases, documents, flat files, and various proprietary formats in binary files. Often, such data is analyzed by various parties (e.g., experts, technicians, managers, etc.), resulting in rich interpretive information commonly referred to as tacit knowledge. Such tacit knowledge, however, is often only temporarily captured, for example, as cryptic notes in a lab notebook, discussions/conversations, presentations, instant messaging exchanges, e-mails and the like. Because this tacit knowledge is not typically captured in the environment in which the related data is viewed and analyzed, it is often lost.

One approach to capture tacit knowledge more permanently is to create annotations containing descriptive information about data objects. Virtually any identifiable type of data appearing in a data source may be annotated as a data object, including, a matrix of data (e.g., a spreadsheet or database table), a text document, or an image. Further, subportions of objects (sub-objects) may be annotated, such as an individual cell, row or column in a database table or a section, paragraph or word in a text document. Typically, an indexing scheme is used to create an index that maps each annotation to the annotated data object or sub-object. The index should provide enough specificity to allow the indexing scheme to locate the annotated data object (or sub-object). Further, the indexing scheme should work both ways to be effective: that is, given an index, the scheme will locate a corresponding data object, and given an object, the scheme will calculate the index values for use in classification, comparison and searching (e.g., to search for annotations for a given data object).

An annotation system stores descriptive information, in the form of annotations, about data objects, without modifying the data objects directly. An annotation store, typically implemented using a database, stores the annotations along with the index values used to map each annotation to a data object, or the position within a data object.

Problems may arise when a group of collaborators interacting with an annotation system use a variety of different type applications to review and access the same data sources. Some applications, for example, may be configured only to view, and not create or modify a particular data source. Such an application may reference portions of a data source using a start byte and an offset, while the application used to generate the data source may refer to section, paragraph, line, word, etc. Thus, one application accessing a data source may not be able to properly identify a data object corresponding to an annotation due to different indexing methods used by different applications to reference data objects within the same data source. Accordingly, the usefulness of the annotation, and the tacit knowledge it captures, may be limited by the application environment in which the annotation is created.

Thus, there is a need for methods and systems for sharing annotations created for portions of a data source when different users may view the data source using variety of different applications. Preferably, the methods and systems will allow users to view annotations created for data objects within one data source, regardless of the application used to view the data source.

SUMMARY OF THE INVENTION

The present invention is generally directed to methods, systems, and articles of manufacture for accessing and viewing annotations created for data objects using a plurality of different viewing applications. Doing so allows users to view annotated data objects in common data source.

One embodiment provides a method for accessing, using a second application, annotations created by a first application. The method generally includes, receiving a request, from the second application for an indication of annotated data objects described by the annotations and obtaining a first set of parameters used by the first application to identify the annotated data objects. The method generally also includes transforming the first set of parameters to a second set of parameters suitable for use by the second application to identify the annotated data objects and returning the second set of parameters to the second application.

Another embodiment provides an annotation system allowing a second application to access annotations created by a first application, wherein the first and second applications identify annotatable portions of a common data source with different identifying parameters. The annotation system generally includes an indexing component configured to receive, from the second application, a request for an indication of one or more annotated data objects contained in the common data source, wherein the annotated data objects are referenced by annotations created by the first application. The annotation system also generally includes a mapping component configured to receive, from the indexing component, a first set of parameters usable by the first application to identify the annotated data objects, to transform the first set of parameters into a second set of parameters usable by the second application to identify the annotated data objects, and to return the second set of parameters to the second application.

Another embodiment provides a computer-readable medium containing an executable component for accessing, using a second application, annotations created by a first application. When executed by a processor the executable component performs operations generally including receiving a request, from the second application for an indication of annotated data objects described by the annotations and obtaining a first set of parameters used by the first application to identify the annotated data objects. The operations also generally include, transforming the first set of parameters to a second set of parameters suitable for use by the second application to identify the annotated data objects and returning the second set of parameters to the second application

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and do not, therefore, limit its scope, for the invention may admit to other equally effective embodiments.

DETAILED DESCRIPTION OF THE PREFERRED EMBODIMENTS

Figure 1:
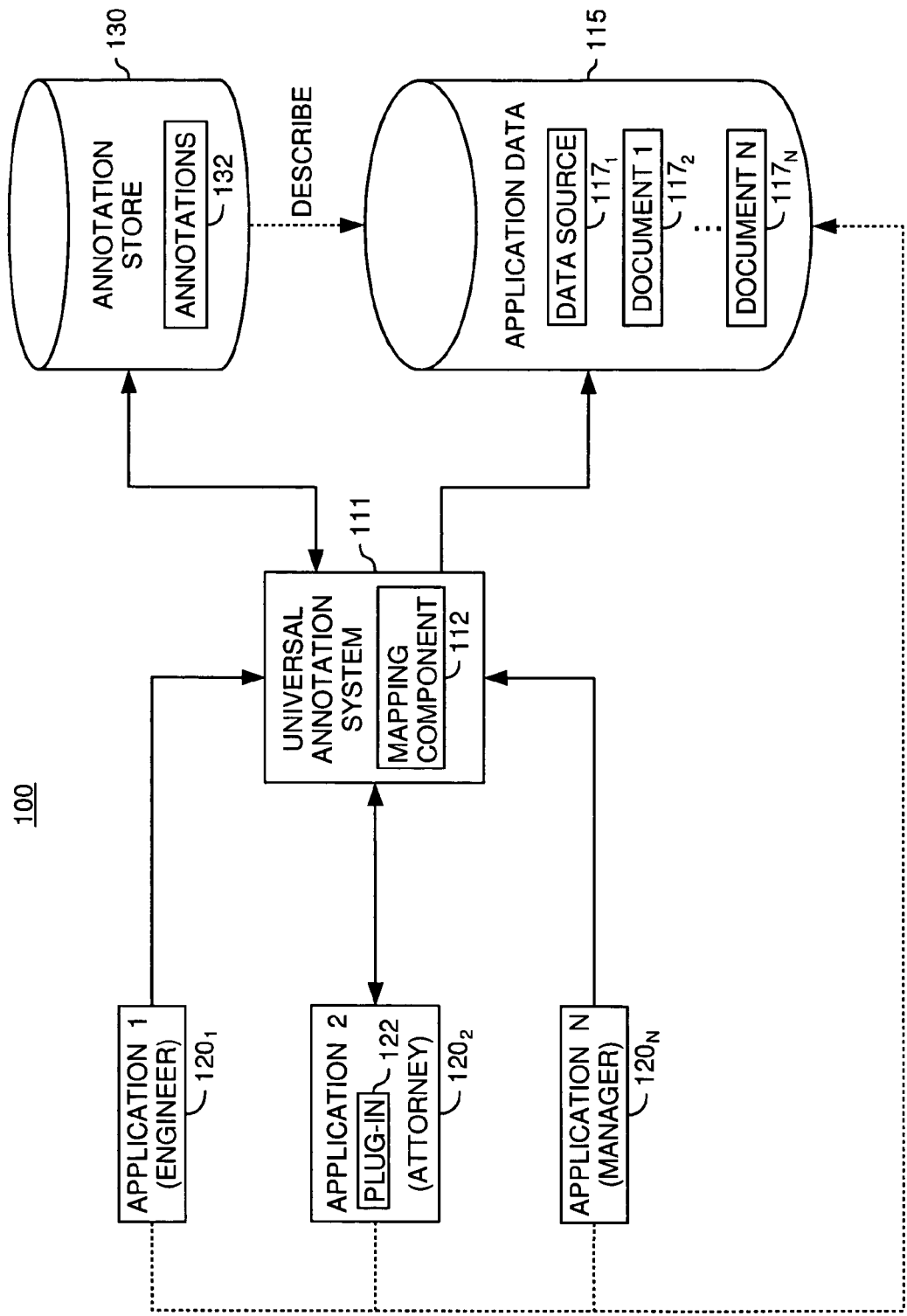
FIG. 1 illustrates an exemplary computing environment in which embodiments of the present invention may be used.

The present invention provides methods, systems, and articles of manufacture that may be used by a variety of different types of applications to view and display annotations, regardless of the application used to create the annotation. Some embodiments allow users collaborating on a project to access and view annotations created for a data object without being confined to using a single computing environment (e.g. a single hardware architecture, operating system and/or set of user applications) to access common data sources. Doing so may facilitate and encourage users to capture and share tacit knowledge, in the form of annotations, across many applications.

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.) or sound clips, etc. While an annotation may exist in any or all of these forms, embodiments of the present invention may be described below with reference to textual annotations as a particular, but not limiting, example of an annotation. Accordingly, as persons of ordinary skill in the art will understand, the following techniques described with reference to textual annotations may also be applied to other types of annotations, as well, and more generally, to any type of reference to a data object.

As used herein, the term data source generally refers to any type of content containing item, including without limitation, text documents, database records, database tables, spreadsheets, schematics, images, multi-media, and any other data source used by an application to create manage, edit, store, view and/or analyze data. Additionally, as used herein, the term user generally applies to any entity using the annotation system or techniques described herein, including, both a person (e.g., an individual) interacting with an application program and an application program performing automated tasks. While the following description may occasionally refer to a graphical user interface (GUI) that may present information to, and receive information from, a person, those of ordinary skill in the art will understand that the same functionality may be provided through a non-graphical user interface, such as a command line and, further, that similar information may be exchanged with non-persons and/or automated agents (e.g. a software daemon) via programming interfaces.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the internet and other networks. Such signal-bearing media represent embodiments of the present invention when carrying computer-readable instructions that direct the functions of the present invention.

In general, the routines executed to implement the embodiments of the invention, may be part of an operating system or a specific application, component, program, module, object, or sequence of instructions. The software of the present invention typically is comprised of a multitude of instructions transformed by the native computer into a machine-readable format, and hence, executable instructions. Software programs are also comprised of variables and data structures that may either reside locally to the program or may be found in memory or on storage devices. In addition, various programs described hereinafter may be identified based upon the application for which they are implemented in a specific embodiment of the invention. Those skilled in the art, however, will appreciate that any particular nomenclature that follows is used merely for convenience, and accordingly, does not limit the present invention to use solely in any specific application identified and/or implied by such nomenclature.

Embodiments of the present invention may be implemented in a hardware/software configuration including at least one networked client computer and at least one server computer, although the client-server model is merely illustrative, and not limiting of the invention. Furthermore, embodiments of the present invention apply to any comparable hardware configuration, regardless of whether the computer systems are complicated, multi-user computing apparatuses, single-user workstations, or network appliances lacking, or limited, non-volatile storage of their own.

In the following, reference is made to embodiments of the invention. It should be understood, however, that the invention is not limited to any specific embodiments described herein. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether a particular advantage is achieved by a given embodiment is not limiting of the invention. Thus, the following aspects, features, embodiments and advantages are merely illustrative and, unless explicitly present, are not considered elements or limitations of the appended claims.

An Exemplary Environment

FIG. 1 illustrates an exemplary annotation system 111 typically deployed within an enterprise network environment 100. For some embodiments, elements and operation of the present invention may be configured to operate within a comprehensive annotation management system. Examples thereof are described in detail in a commonly owned co-pending application, U.S. Ser. No. 10/600,014, filed Jun. 20, 2003 entitled "Universal Annotation Management System," herein incorporated by reference.

Among other things, the annotation system 111 may include components configured to allow users of the enterprise system 100 to view annotations created for a data object in a data source using a first application $120_1$ in other applications $120_{2-N}$ capable of accessing the same data source. The annotation system 111 may be provided to enterprise users, for example, from a service provider in the business of installing such systems. In an effort to ensure successful deployment of the annotation system 111, the service provider may address both the capture and harvest (retrieval) of tacit knowledge in the form of annotations 132. The capture process generally involves users (e.g., people or, in some cases, application programs) entering annotation content about an item of "target" data. Once captured, the present invention may allow users to retrieve and view annotations created for the item of "target" data in a variety of different applications configured to access the data source containing the "target" data.

"Target" data may include textual or tabular data (structured, usually non-textual), graphical data, audio data or any other type of data object within a data source created by an application program such as a word processor, database, spreadsheet, flow diagram, schematic (e.g., electrical or mechanical) or other software application.

The annotation system 111 may be integrated with the rest of the enterprise system 100 through an independent annotation browser and/or plug-in components communicating with a central annotation server, allowing annotations 132 created in a first application $120_1$ to be accessed from other applications 120 used throughout the enterprise. Thus, the annotation system 111 provides a means for capturing and sharing tacit knowledge that can be analyzed and used among many existing processes, in a wide variety of industries.

During the capture process, users typically enter annotation content by interacting with software that may be embedded within their particular applications (e.g., as a plug-in component). Alternatively, users may interact with an annotation application external to their applications, for example, a stand-alone annotation browser. The annotations 132 may be stored in a central annotation repository (e.g., an annotation store 130), which may be searched either independently or in conjunction with the annotated data. The annotations 132, for example, may capture insights of different users collaborating on a common project, such as a manager, an attorney and an engineer, each using different applications capable of communicating with the annotation system 111 and viewing application data 115.

For example, the engineer may be working in a research lab using a Linux environment and using a software application $120_1$, such as Open Office. The attorney, on the other hand, might be running a different application $120_2$, such as Word-Perfect. While the manager might be running yet a third application $120_N$, such as Microsoft Word. Each of these illustrative applications $120_{1-N}$ may be capable of viewing data sources (e.g., word processor documents) created in the others. At the same time, however, each of these illustrative applications may create, store, and access data sources differently.

For example, one word processor may represent the position of data objects in a document using page, paragraph and line numbers, while another word processor may do the same using a start byte and offset. Thus, the parameters used by a first application to identify a data object (e.g., page, paragraph and line number), may be incompatible with the parameters used by second application (e.g., start byte and offset) viewing the same data source. As described in greater detail below, mapping component 112, may be used to convert a first set of parameters associated with an annotation 132 used by application $120_1$ to identify a data object in a data source $117_1$ to a second set of parameters used by applications $120_{2-n}$ capable of viewing data source $117_1$.

The annotation store 130 may contain annotations created for various data objects within a variety of different type data sources. For example, data source $117_1$ might be a project status report generated by the engineer using a first application $120_1$, reviewed by the attorney using a second application (e.g., for use in drafting patent applications), $120_2$ and also by the manager using a third application $120_N$, (e.g., to manage compliance with milestones or other performance goals). Some embodiments of the present invention may allow the attorney and the engineer to review annotations created for the project status report without having to use the same application type to view the data source $117_1$.

Figure 2:
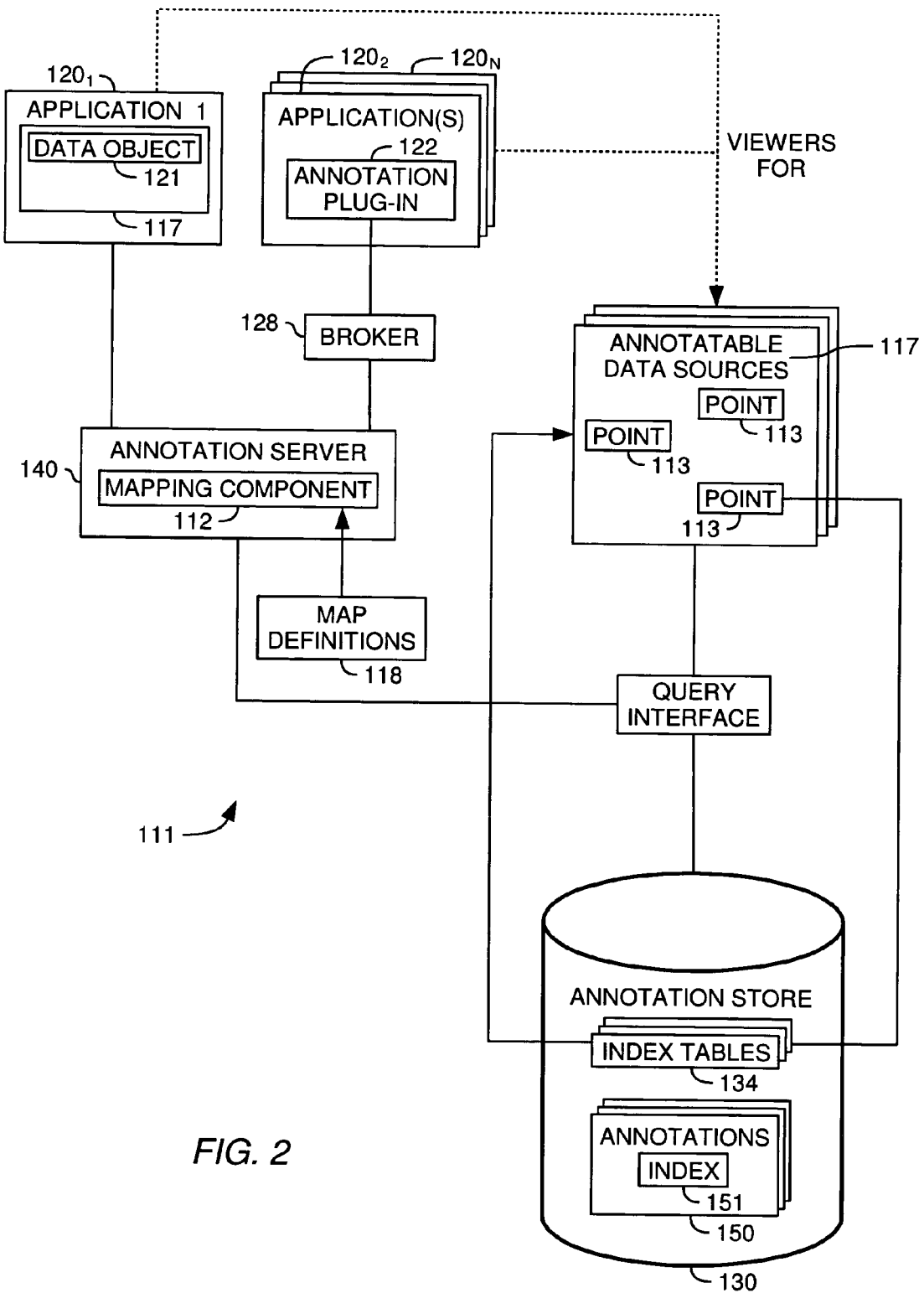
FIG. 2 is a relational view of an annotation system, according to one embodiment of the present invention.

FIG. 2 illustrates a relational view of exemplary components of the annotation system 111 including an annotation server 140 and mapping component 112, according to one embodiment of the present invention. One or more applications $120_{1-N}$ (e.g., running on one or more client computers) may communicate with the annotation server 140 either directly (e.g., application $120_1$), via annotation plug-ins 122 or annotation broker 128 (e.g., applications $120_2$-$120_N$), to view annotations for data objects manipulated by the applications $120_{1-n}$. The annotation broker 128 may serve as an interface between annotation plug-ins 122 integrated into multiple applications and the annotation server 140. For example, the annotation broker 128 may manage messages between multiple applications plug-ins and the annotation server. As illustrated, the annotation server 140 may issue queries against the annotation store 130 via a query interface 119.

For some embodiments, an index, or set of indexes, may be stored with each annotation record 150 and used to identify the data object(s) corresponding to the annotation. As illustrated, an index 151 obtained from an annotation record 150 or index table(s) 134 may be used to identify the annotated data object or sub-objects, commonly referred to as annotated points 113, within an annotatable data source 117. Index table 134 may include a table listing the index value used by the annotation system to reference the annotation 150 (e.g., a GUID) and an annotation point 113. Each annotation point listed in index table 134 may comprise a reference to the data source 117 containing the data object along with the index parameters that may be used to locate within the data source 117 the annotation point or points 113.

As used herein, the term point 113 may generally refer to any identifiable data unit (or group of data units) capable of being annotated, i.e., a data object. Each point 113 defines the location, or position, within a data source of the data object associated with the annotation 132. In other words, each point identifies the "target" data described by the annotation. Examples of annotatable points 113 include, but are not limited to, database tables, rows, columns, cells, or groups of cells, selected portions of a text document (e.g., defined by an offset and length, start and stop locations, or any other suitable defining information), and the like. Multiple points in an object may be referenced by the same annotation and any point in an object may be referenced by multiple annotations. Further, an annotation may reference points in more than one annotatable data source 117.

Mapping Annotation Points

After retrieving an annotation record 150 from the annotation store, the object described by the annotation can be found using the index 151, and conversely, annotations for a given object can be found in the annotation store 130, based on an index generated from a set of identifying parameters. The set of parameters calculated for a particular object may be based on the way an application $120_1$ (or application plug-in 122) manages a data source. Accordingly, the set of parameters calculated by one application $120_{1-N}$ for a data object (e.g. a database viewer using abstract fields to address data objects), may be different than those calculated by another application viewing the same data source (e.g. a database viewer using physical fields to address data objects).

In such a case, the set of parameters created by different applications, $120_1$ and $120_2$, may be different, even though each is meant to reference the same point 113 in the same data source 117. Thus, when a variety of application types are configured to access and view a data source 117, the set of parameters generated by a first application (e.g., the application used to create the annotation) may need to be transformed by mapping component 112 into a form suitable for use by a second application. (e.g., an application used to view the annotation).

Figure 3A:
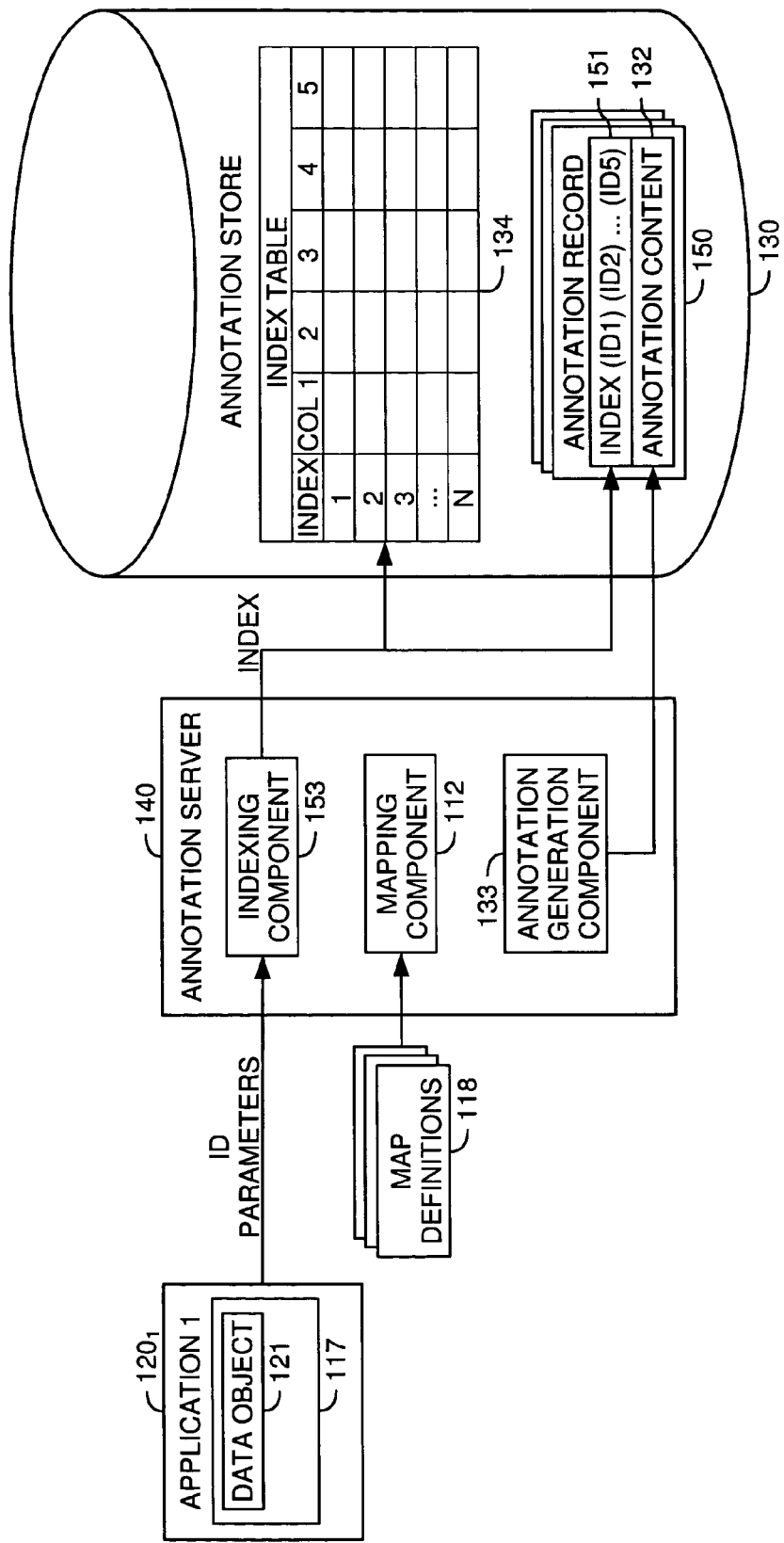
FIG. 3 is a relational view of components of an annotation management system configured according to one embodiment of the present invention.
Figure 3B:
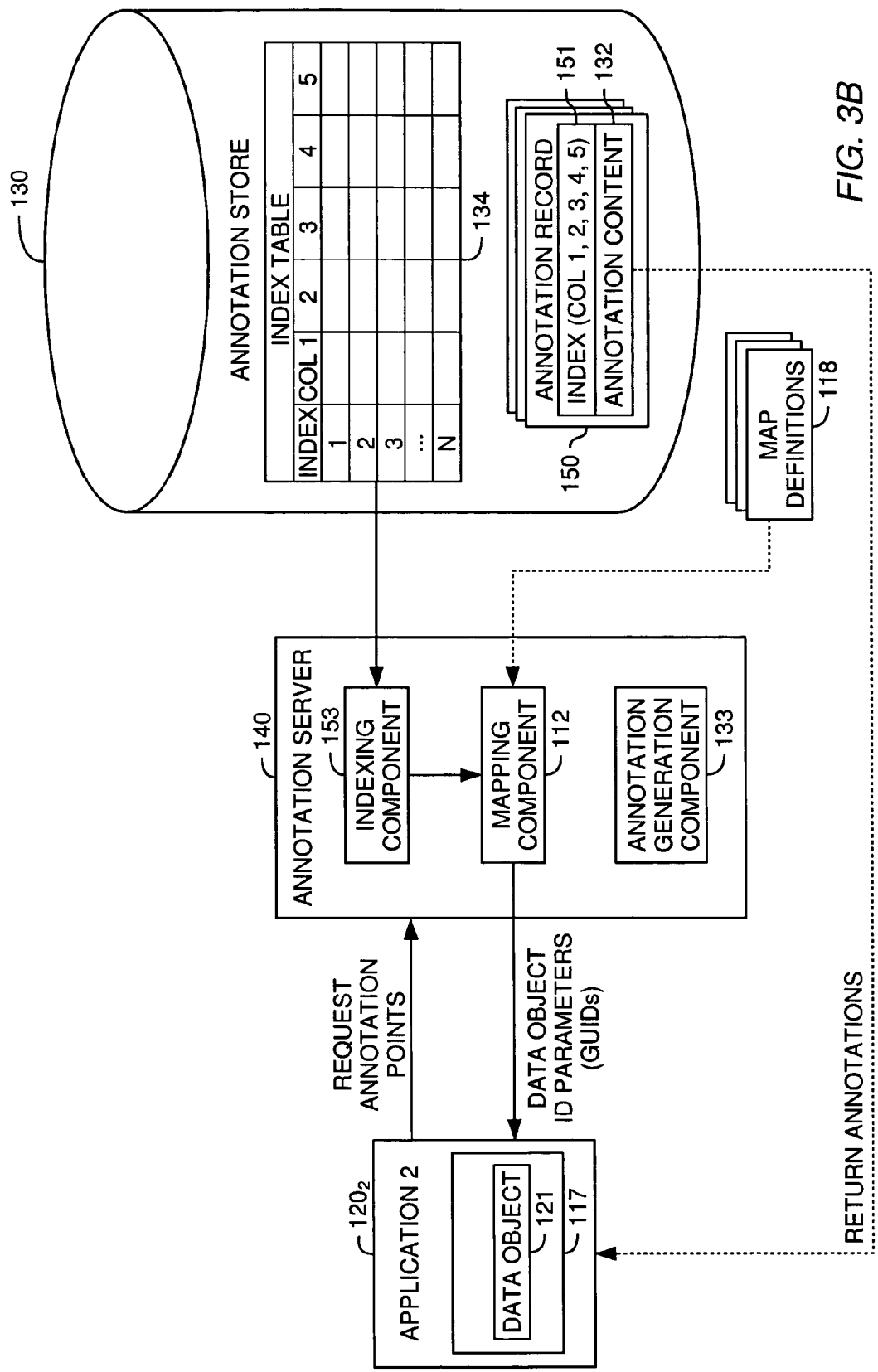

FIG. 3A illustrates a relational view of the annotation server 140 and various other components of the annotation system that may be used to create annotations records 150 stored in the annotation store 130, from within a first application $120_1$, describing a data object 121 in a data source 117. Conversely, FIG. 3B illustrates the annotation server 140 and various other components used to retrieve annotation record 150 and map the corresponding annotation points when the data source 117 is viewed using a second application $120_2$.

When a user interacting with application $120_1$ selects to annotate a data object 121, the annotation server 140 may create the annotation using indexing component 153 and annotation generation component 133. Application $120_1$ (or alternatively application plug-in 122 for an application using an integrated plug-in) may generate a set of parameters used by application $120_1$ to identify the selected data object 121. For example, the set of parameters may be an indication of page, paragraph and line number used by a word processor to identify the data object 121 or could be indication of primary key, foreign key and attributes specifying a record in a database.

For some embodiments, the indexing component 153 may use the parameters to generate an index 151 used by the annotation system 111. Examples of suitable techniques for indexing a variety of different type data objects are described in detail in a commonly owned co-pending application, U.S. Ser. No. 10/600,382, filed Jun. 20, 2003 entitled "Heterogeneous Multi-Level Extendable Indexing for General Purpose Annotation Systems," incorporated herein by reference.

For some embodiments the annotation generation component 133 may be used to capture the annotation content entered by a user to describe the data object 121 being annotated. Once a user provides the annotation content, the annotation server 140 may combine the index 151 generated by the indexing component 153 and the annotation generated by the annotation generation component 133 to create a new annotation record 150 and store it in the annotation store 130.

Turning to FIG. 3B, Once a data object has been annotated, users may access the data source containing annotated data object 121 using a variety of different applications $120_{1-N}$. FIG. 3B illustrates components of the annotation system 111 that may be used to retrieve and view an annotations created by the first application $120_1$ using a second application $120_2$ to view the same data source.

For some embodiments, when application $120_2$ accesses the data source 117, the application $120_2$ (or application plug-in 122) may request that the annotation server 111 provide an indication of annotations that have been created for the data source 117. The annotation server 140 may identify annotations created for the data source 117 using index table 134. Entries in the index table 134 may comprise an annotation identifier (e.g., a GUID) used to identify each annotation contained in annotation store 130 and an annotation index 151 used to identify the data source 117 associated with the annotation and the corresponding the data object 121.

Thus, for some embodiments, the annotation server 140 queries the index table 134 to obtain a set of GUID's and indexes that correspond to data objects 121 appearing in data source 117. Once the annotation server 140 identifies the annotations associated with the data source 117 being accessed by the application $120_2$, indexing component 153 may transform the index 151 used by the annotation server 140 to the set of parameters used by the application (e.g., application $120_1$) to identify a data object. As described above, Application $120_1$ and $120_2$ may use different sets of parameters the data object 121 corresponding to the index retrieved by the annotation server 140.

When the application $120_2$, accessing data source 117 differs from the application $120_1$ used to create the data source, mapping component 112 may transform the parameters to those used by the application $120_2$ to identify the data object 121. For example, mapping component 112 may transform page, paragraph and line numbers used by the first application $120_1$, to create the annotation, to a start byte and offset used by the second application $120_2$ to view the data source containing the annotated data object 121.

The mapping component 112 may transform the parameters for each index 151 using one of a set of map definitions 118. Each set of map definitions 118 may define a mapping between a set of parameters used by a first application, to a set of parameters used by a second application to identify the annotated data object 121.

In some embodiments, the mapping component 112 may use an XML transformation language. An XML transformation language is a programming language designed to create an output XML document based on an input XML document. In such an embodiment, mapping component 112 may comprise an XML transformation engine configured to transform the set of parameters used by one data source type to others using mapping definitions 118 (e.g., XML transformation programs written in the XML transformation language). In such an embodiment, the input XML document may contain elements that describe the parameters used by application $120_1$ to identify a data object 121. And the output XML document may contain elements describing a second set of parameters used by application $120_2$ to identify the same data object 121. Using an XML transformation language allows the translation component 112 to convert sets of parameters among different application viewer types.

For some embodiments, after the annotation server 140 provides application $120_2$ with the set of transformed parameters, the application $120_2$ may use the set of transformed parameters to identify each data object 121 in the data source 117 that has been annotated. For some embodiments using a GUI Interface, application $120_2$ may be configured to indicate to the user that annotations are available to retrieve and view, by displaying, for example, an icon, or icons, adjacent to the annotated data object.

Retrieving and Displaying Annotations

Figure 4:
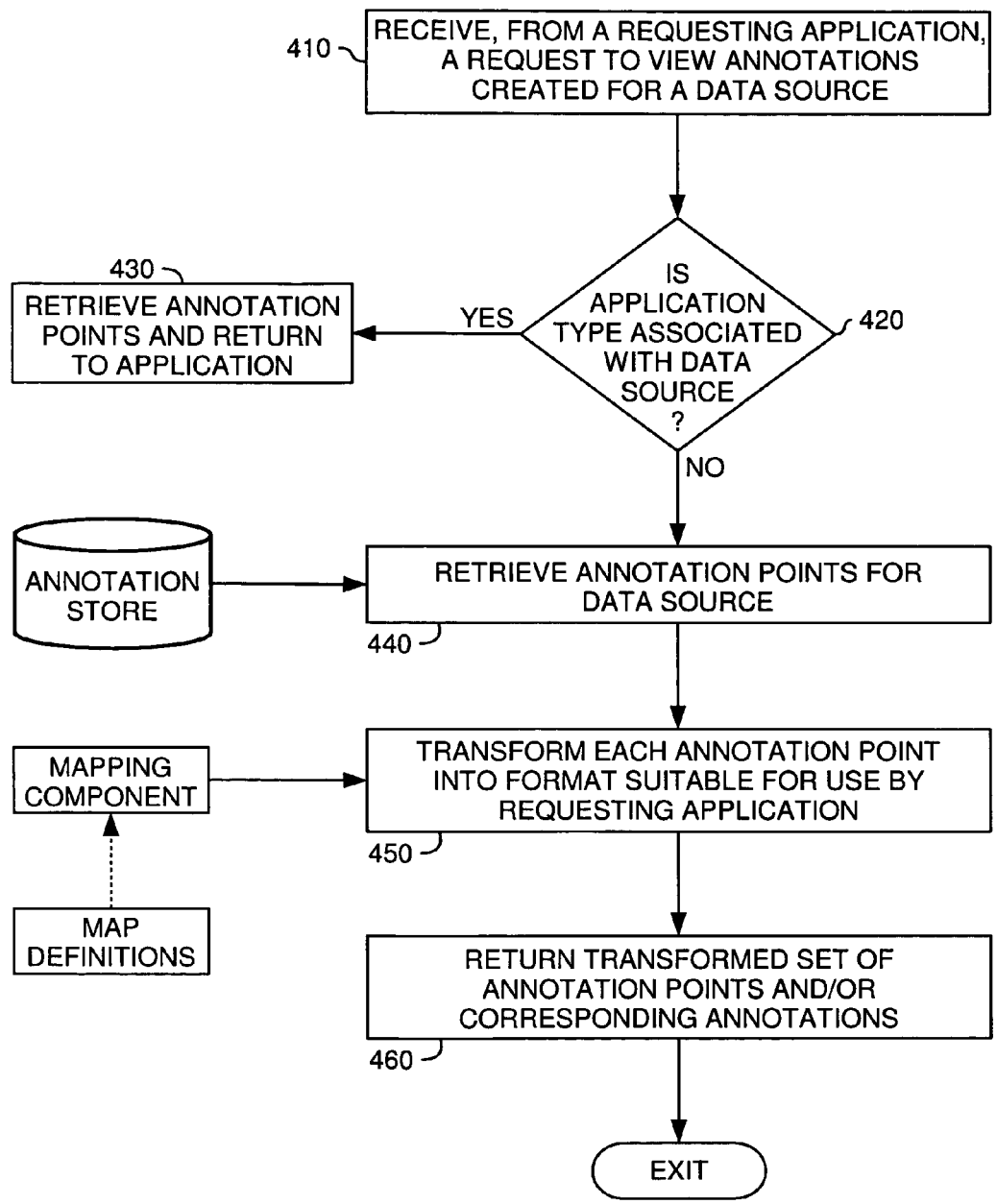
FIG. 4 is a flow chart illustrating exemplary operations for retrieving and displaying annotations according to one embodiment of the present invention.
Figure 5:
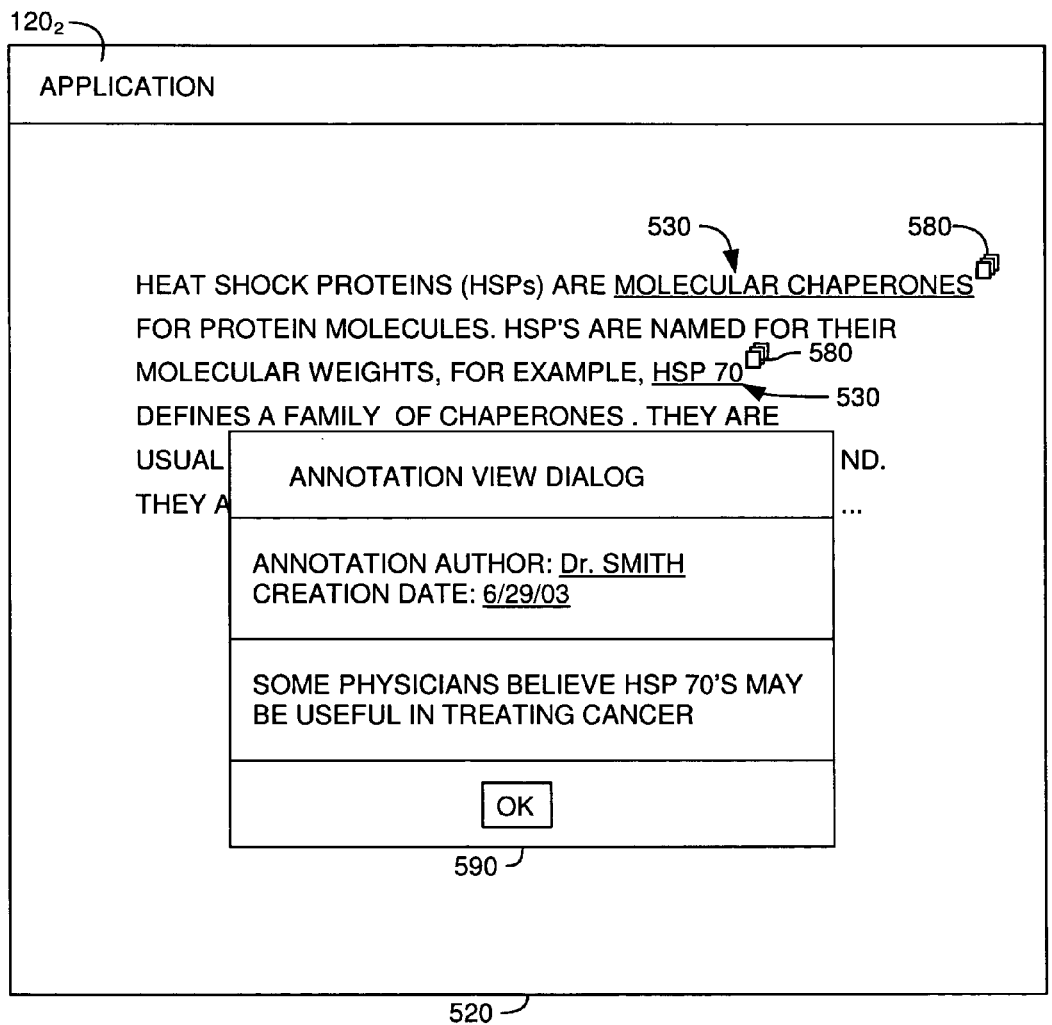
FIG. 5 is an illustration of an exemplary graphical user interface (GUI) screen, according to one embodiment of the present invention.

FIG. 4 illustrates exemplary operations 400 for retrieving annotations. For some embodiments, a user may carry out operations 400 by interacting with an application $120_2$ that presents the user with one or more graphical user interface screens. FIG. 5 illustrates one such exemplary GUI interface screen 500 that shows a data source 520 (a technical document in this illustration) along with icons 530 indicating that annotations exist for adjacent data objects 530, along with a dialog box 540 that may be used to display a retrieved annotation 590. Data source 520 may have been created and annotated using an application other than application $120_2$. Thus, application $120_2$ may not be configured to use the set of parameters used by application $120_1$ to create the annotation as previously described.

The operations 400 begin at step 410, by receiving a request to view annotations 132. For example, the application program $120_2$ may request the annotation server 140 to identify the data objects 121 appearing in a data source 520 that have existing annotation records 150 in the annotation store 130 when a user accesses the data source 117.

At step 420, annotation server 140 may compare the type of data source being accessed by application $120_1$. For example, along with the request to identify annotations 132, the application program $120_1$ may also identify the data source types (or an application type) for which the annotation server 140 may return annotation points without requiring that the mapping component 112 first transform them. At step 430, if the data source type or application type corresponds to one that the application has identified (e.g., the same application used to create the annotations), then the annotation server 140 may return an indication of annotated data objects to the application $120_1$ without first mapping the set of parameters used by application $120_1$ to identify annotated data objects 121.

On the other hand, at step 440, when the application $120_2$ viewing the data source 520 cannot use the returned annotation points to identify annotated data objects, mapping component 112 may transform each point before returning them to application $120_2$ into a form suitable for application $120_2$ to identify the annotated data objects 121. After the annotation server 140 retrieves the annotations (or for some embodiments, just the indexes and GUIDs), the mapping component 112 may transform the first set of parameters using one of the set of map definitions 118, at step 450. Once transformed, at step 460, the annotation server 140 may return the transformed set of parameters along with the GUIDs to application $120_2$. Using the transformed set of parameters, an annotation icon 580 may be displayed adjacent to each annotated data object 530 in data source 520.

For some embodiments, the operations 400 may begin when a user interacts with an application program 120 to view a data source. For example, the attorney may use application $120_2$ to view a technical document 520 prepared by the engineer using application $120_1$, to assist in preparing a patent application. When the attorney accesses the technical document 520, the application $120_2$ may request the application server 140 to return annotations 132, or corresponding indexes 151 and GUIDs, for annotated data objects 530 appearing in the technical document 520.

Before returning the identified annotation points to application $120_2$, as described above, the pattern mapping component 112 may use a mapping definition 118 corresponding to the application types of the technical document 520 and the application $120_2$ to transform the set of parameters used by $120_2$ to identify the annotated data objects 530 appearing in the technical document 520. Using the transformed parameters, application $120_2$ may present the attorney with an annotation icon 580 adjacent to each annotated data object 121 in the technical document 520.

When the user (e.g., the attorney) selects to view an annotation (e.g., by clicking on an annotation icon 580), a dialog box 540 may present the user with annotation 590. Using the GUID provided to application $120_2$, as described above, the annotation system may retrieve the corresponding annotation 590 and return it to application $120_2$ for display to the user.

Conclusion

Mapping annotation points allows a variety of applications capable of viewing data sources created by a variety of other applications to view annotations created for data sources stored and managed by an annotation system. Doing so allows various members of an enterprise network collaborating on a project the ability to use applications tailored, for example, to each individual's role, rather than forcing different users to a single set of application types to views annotations.

While the foregoing is directed to specific embodiments of the present invention, other and further embodiments of the invention may be devised without departing from the basic scope thereof; the scope thereof is determined by the claims that follow.

What is claimed is:

1. A method for accessing, using a second application, annotations created by a first application, comprising:
   receiving a request, from the second application, for an indication of annotated data objects described by the annotations, wherein the data objects appear in a data source being accessed by the second application, wherein the data source was created using the first application;
   obtaining, from an index table, a first set of parameters used by the first application to identify the annotated data objects, wherein the index table stores a unique identifier for each annotated data object based on a set of identification (ID) parameters, wherein each parameter of the first set of parameters corresponds to a respective column in the index table, wherein each parameter of the first set of parameters is based on a first access type used by the first application to access the data source;
   transforming the first set of parameters of the index table into a second set of parameters suitable for use by the second application to identify the annotated data objects, wherein the second set of parameters is based on a second access type used by the second application to access the data source; and
   in response to the request, returning the second set of parameters to the second application as the indication of the annotated data objects described by the annotations.

2. The method of claim 1, wherein the request for an indication of annotated data objects includes an indication of the second application.

3. The method of claim 1, wherein obtaining a first set of parameters comprises querying an annotation store to identify annotations created for data objects appearing in the data source being accessed by the second application.

4. The method of claim 1, further comprising displaying an indication of annotated data objects in the second application based upon the second set of parameters.

5. The method of claim 1, wherein the request for an indication of annotated data objects includes an indication of an application type associated with the second application.

6. The method of claim 1, further comprising returning the annotations to the second application.

7. The method of claim 1, wherein transforming the first set of parameters to the second set of parameters comprises selecting and using an annotation point map associated with the first and second applications, wherein the annotation point map contains sufficient information to transform the first set of parameters usable by the first application into the second set of parameters usable by the second application.

8. An annotation system comprising one or more computer processors configured to allow a second application to access annotations created by a first application, wherein the first and second applications identify annotatable portions of a common data source with different identifying parameters, comprising: an indexing component configured to: receive, from the second application, a request for an indication of one or more annotated data objects contained in the common data source, wherein the annotated data objects are referenced by annotations created by the first application; and maintain, in an index table, a unique identifier for each annotated data object based on a first set of identification (ID) parameters, wherein each parameter of the first set of parameters corresponds to a respective column in the index table; and a mapping component configured to receive, from the indexing component, a first set of parameters usable by the first application to identify the annotated data objects, to transform the first set of parameters into a second set of parameters usable by the second application to identify the annotated data objects, and to return the second set of parameters to the second application; wherein the mapping component transforms the first set of parameters into the second set of parameters by accessing at least one annotation point map from a set of annotation point maps, each annotation point map containing sufficient information to transform a set of parameters usable by one application into a set of parameters usable by another application, wherein each parameter of the first set of parameters is based on a first access type used by the first application to access the data source, wherein the second set of parameters is based on a second access type used by the second application to access the data source.

9. The annotation system of claim 8, wherein each annotation point map comprises an XML document.

10. The annotation system of claim 8, wherein:
the annotation system further comprises an annotation store; and
the annotation system returns the unique identifier for each annotation referencing the annotated data objects.

11. A non-transitory computer-readable storage medium containing a program for accessing, using a second application, annotations created by a first application which, when executed by a processor, performs operations comprising:
receiving a request, from the second application for an indication of annotated data objects described by the annotations, wherein the data objects appear in a data source being accessed by the second application, wherein the data source was created using the first application;
obtaining, from an index table, a first set of parameters used by the first application to identify the annotated data objects, wherein the index table stores a unique identifier for each annotated data object based on a set of identification (ID) parameters, wherein each parameter of the first set of parameters corresponds to a respective column in the index table, wherein each parameter of the first set of parameters is based on a first access type used by the first application to access the data source;
transforming the first set of parameters of the index table to a second set of parameters suitable for use by the second application to identify the annotated data objects, wherein the second set of parameters is based on a second access type used by the second application to access the data source; and
returning the second set of parameters to the second application.

12. The non-transitory computer-readable storage medium of claim 11, wherein obtaining the first set of parameters comprises querying the index table to identify annotations created for data objects appearing the data source being accessed by the second application.

13. The non-transitory computer-readable storage medium of claim 11, wherein the operations further comprise returning unique identifiers corresponding to identified annotations created for data objects appearing the data source being accessed by the second application.

14. A method of creating and retrieving annotations using a plurality of different type applications, comprising:
receiving, from a first application, a request to create an annotation for a data object appearing in a data source, the data source identified by a first set of parameters;
generating an index based on the first set of parameters, wherein the index includes a unique identifier for each data object based on a set of identification (ID) parameters, of the first set of parameters, wherein each parameter of the first set of parameters corresponds to a respective column in the index table, wherein each parameter of the first set of parameters is based on a first access type used by the first application to access the data source;
storing, in an annotation store, the annotation and index in an annotation record;
receiving, from a second application accessing the data source, a request to identify annotated data objects in the data source;
in response to the request, retrieving the index generated based on the first set of parameters identifying the data object, wherein the index is retrieved from the index table, and wherein retrieving the index comprises:
querying the index table for indexes corresponding to annotations describing data object contained in the data source;
converting the index into the first set of parameters;
transforming the first set of parameters of the index to a second set of parameters suitable for use by the second application, wherein the second set of parameters is based on a second access type used by the second application to access the data source, wherein transforming comprises:
selecting, from a plurality of map definitions, a map definition associated with the first and second application; and transforming the first set of parameters to the second set of parameters based on information in the selected map definition; and returning the second set of parameters to the second application.

15. The method of claim 14, wherein the first application is a word processing application and the second application is a viewer.

16. The method of claim 14, further comprising returning to the second application a unique identifier of the annotation record.

* * * * *